United States Patent
Wang

(10) Patent No.: US 10,925,015 B2
(45) Date of Patent: Feb. 16, 2021

(54) METHOD AND APPARATUS FOR TRANSMITTING DATA FRAME IN A LONG TERM EVOLUTION UNLICENSED (LTE-U)SYSTEM

(71) Applicant: Huawei Technologies Co., Ltd., Guangdong (CN)

(72) Inventor: Jian Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/523,053

(22) PCT Filed: Oct. 29, 2014

(86) PCT No.: PCT/CN2014/089789
§ 371 (c)(1),
(2) Date: Apr. 28, 2017

(87) PCT Pub. No.: WO2016/065553
PCT Pub. Date: May 6, 2016

(65) Prior Publication Data
US 2017/0318550 A1    Nov. 2, 2017

(51) Int. Cl.
*H04W 56/00* (2009.01)
*H04W 40/02* (2009.01)
(Continued)

(52) U.S. Cl.
CPC ......... *H04W 56/001* (2013.01); *H04W 24/10* (2013.01); *H04W 40/02* (2013.01);
(Continued)

(58) Field of Classification Search
None
See application file for complete search history.

(56) References Cited

U.S. PATENT DOCUMENTS 8,072,309 B2   12/2011   Kraimer et al.
8,280,380 B2   10/2012   Kim et al.
(Continued)

FOREIGN PATENT DOCUMENTS

CN   1530792 A      9/2004
CN   101247591 A    8/2008
(Continued)

OTHER PUBLICATIONS

CMCC, "Deployment Scenarios for Licensed-Assisted Access using LTE," R1-143953, 3GPP TSG-RAN WG1 #78bis, Ljubljana, Slovenia, Oct. 6-10, 2014, 5 pages.
(Continued)

*Primary Examiner* — Donald L Mills
(74) *Attorney, Agent, or Firm* — Rimon PC

(57) ABSTRACT

A method and an apparatus for transmitting a data subframe are disclosed and relate to the field of mobile communications technologies. In this method, a first device determines a to-be-transmitted data frame, where the to-be-transmitted data frame carries an identifier of an operator to which the first device belongs (100); the first device transmits the to-be-transmitted data frame to a second device (110); and the second device processes, according to the identifier of the operator to which the first device belongs, the data frame transmitted by the first device (210). Because the to-be-transmitted data frame determined by the first device carries the identifier of the operator to which the first device belongs, the first device can accurately perform channel measurement and feedback.

15 Claims, 4 Drawing Sheets

(51) Int. Cl.
*H04W 24/10* (2009.01)
*H04W 72/04* (2009.01)
*H04W 24/08* (2009.01)
*H04W 88/02* (2009.01)
*H04W 88/08* (2009.01)

(52) U.S. Cl.
CPC ........ *H04W 72/0446* (2013.01); *H04W 24/08* (2013.01); *H04W 88/02* (2013.01); *H04W 88/08* (2013.01)

(56) References Cited

U.S. PATENT DOCUMENTS

| | | |
|---|---|---|
| 10,299,137 B2 * | 5/2019 | Cui .................. H04W 74/0808 |
| 2008/0219213 A1 | 9/2008 | Natarajan et al. |
| 2009/0232066 A1 | 9/2009 | Rinne et al. |
| 2011/0299511 A1 | 12/2011 | Cook |
| 2012/0094681 A1 | 4/2012 | Freda et al. |
| 2012/0129560 A1 | 5/2012 | Lunden et al. |
| 2012/0230250 A1 | 9/2012 | Kasslin et al. |
| 2013/0143502 A1 | 6/2013 | Kazmi et al. |
| 2014/0342747 A1 | 11/2014 | Lee et al. |
| 2014/0369198 A1 | 12/2014 | Rinne et al. |
| 2015/0098349 A1 * | 4/2015 | Wei ...................... H04W 16/14 370/252 |
| 2015/0172950 A1 * | 6/2015 | Chen .................... H04W 16/14 370/252 |
| 2015/0264699 A1 * | 9/2015 | Fwu ..................... H04L 5/0001 370/329 |
| 2016/0043841 A1 * | 2/2016 | Lunttila ................ H04L 5/0092 370/280 |
| 2017/0013468 A1 | 1/2017 | Zhu et al. |
| 2017/0019838 A1 * | 1/2017 | Harada ................. H04W 16/14 |
| 2017/0111802 A1 * | 4/2017 | Bhushan ............ H04W 28/0289 |
| 2017/0289936 A1 * | 10/2017 | Chae ..................... H04L 27/26 |
| 2017/0295576 A1 * | 10/2017 | Fukuta ................. H04W 16/14 |

FOREIGN PATENT DOCUMENTS

| | | |
|---|---|---|
| CN | 101926192 A | 12/2010 |
| CN | 102204393 A | 9/2011 |
| CN | 102271322 A | 12/2011 |
| CN | 102932772 A | 2/2013 |
| CN | 103069882 A | 4/2013 |
| CN | 103238361 A | 8/2013 |
| CN | 103281788 A | 9/2013 |
| CN | 103701757 A | 4/2014 |
| CN | 103763708 A | 4/2014 |
| CN | 104054282 A | 9/2014 |
| CN | 104054375 A | 9/2014 |
| WO | 2013124776 A1 | 8/2013 |
| WO | 2013131257 A1 | 9/2013 |
| WO | 2013179095 A1 | 12/2013 |
| WO | 2014102335 A1 | 7/2014 |
| WO | 2014165832 A1 | 10/2014 |
| WO | 2016004279 A1 | 1/2016 |

OTHER PUBLICATIONS

CMCC, "Discussion on radio interface based inter-operator synchronization," R1-141616, 3GPP TSG-RAN WG1 Meeting #76bis, Shenzhen, China, Mar. 31-Apr. 4, 2014, 5 pages.
R3-071158 Samsung,"Requirement discussion for Home ENB",3GPP TSG-RAN WG3 Meeting #56,Kobe, Japan, May 7, 2007, total 4 pages.
S1-122428 Qualcomm Inc. et al.,"Identifiers to use with ProSe Discovery",3GPP TSG-SA WG1 Meeting #59,Chicago, USA, Jul. 30, 2012,total 4 pages.

* cited by examiner

METHOD AND APPARATUS FOR TRANSMITTING DATA FRAME IN A LONG TERM EVOLUTION UNLICENSED (LTE-U)SYSTEM

CROSS REFERENCE TO RELATED APPLICATIONS

The present application claims priority under 35 U.S.C. § 365 to International Patent Application No. PCT/CN2014/089789 filed Oct. 29, 2014 which is incorporated herein by reference in its entirety.

TECHNICAL FIELD

The present invention relates to the field of communications technologies, and in particular, to a method and an apparatus for transmitting a data frame.

BACKGROUND

Spectrums used by a wireless communications system are classified into licensed spectrums (full spelling in English: licensed spectrum) and unlicensed spectrums (full spelling in English: unlicensed spectrum). For a licensed spectrum, after being authorized, a device may use the corresponding spectrum to perform communication. For an unlicensed spectrum, any device may legitimately use these frequency bands. For example, a Wireless Fidelity (full spelling in English: Wireless Fidelity, acronym: Wi-Fi) device performs communication on unlicensed 2.4 GHz and 5 GHz frequency bands.

When an existing Long Term Evolution in unlicensed spectrum (full spelling in English: Long Term Evolution Unlicensed spectrum, acronym: LTE-U) system performs channel measurement and feedback, nodes (LTE-U nodes for short below) cannot be distinguished. Therefore, channel measurement and feedback cannot be accurately performed.

SUMMARY

Embodiments of the present invention provide a method and an apparatus for transmitting a data frame that are applied to an LTE-U system, so as to overcome a disadvantage that in a current data frame transmission manner of an LTE-U node in an LTE-U system, accuracy of channel measurement and feedback performed by the LTE-U node is a relatively low.

According to a first aspect, a method for transmitting a data frame is provided, is applied to a Long Term Evolution unlicensed LTE-U system, and includes:

determining, by a first device, a to-be-transmitted data frame, where the to-be-transmitted data frame carries an identifier of an operator to which the first device belongs; and transmitting, by the first device, the to-be-transmitted data frame to a second device.

With reference to the first aspect, in a first possible implementation manner, the to-be-transmitted data frame further carries an identifier of the to-be-transmitted data frame and/or a sequence number of the to-be-transmitted data frame in a transmission pattern, and the transmission pattern includes a quantity and sequence numbers of data frames in one transmission period.

With reference to the first aspect or the first possible implementation manner of the first aspect, in a second possible implementation manner, the to-be-transmitted data frame further carries an identifier of the first device.

With reference to the first aspect or the first to the second possible implementation manners of the first aspect, in a third possible implementation manner, the to-be-transmitted data frame further carries a synchronization signal.

With reference to the third possible implementation manner of the first aspect, in a fourth possible implementation manner, the synchronization signal includes a primary synchronization signal PSS and/or a secondary synchronization signal SSS.

With reference to the first aspect or the first to the fourth possible implementation manners of the first aspect, in a fifth possible implementation manner, the first device is a base station or user equipment; and the second device is a base station or user equipment.

According to a second aspect, a method for transmitting a data frame is provided, is applied to a Long Term Evolution unlicensed LTE-U system, and includes:

receiving, by a second device, a data frame transmitted by a first device, where the data frame carries an identifier of an operator to which the first device belongs; and processing, by the second device according to the identifier of the operator to which the first device belongs, the data frame transmitted by the first device.

With reference to the second aspect, in a first possible implementation manner, the data frame further carries an identifier of the data frame and/or a sequence number of the data frame in a transmission pattern, and the transmission pattern includes a quantity and sequence numbers of data frames in one transmission period.

With reference to the second aspect or the first possible implementation manner of the second aspect, in a second possible implementation manner, the data frame further carries an identifier of the first device.

With reference to the second aspect or the first to the second possible implementation manners of the second aspect, in a third possible implementation manner, the data frame further carries a synchronization signal.

With reference to the third possible implementation manner of the second aspect, in a fourth possible implementation manner, the synchronization signal includes a primary synchronization signal PSS and/or a secondary synchronization signal SSS.

With reference to the second aspect or the first to the fourth possible implementation manners of the second aspect, in a fifth possible implementation manner, the first device is a base station or user equipment; and the second device is a base station or user equipment.

With reference to the second aspect or the first to the fifth possible implementation manners of the second aspect, in a sixth possible implementation manner, the processing, by the second device according to the identifier of the operator to which the first device belongs, the data frame transmitted by the first device includes: when the identifier of the operator to which the first device belongs is the same as an identifier of an operator to which the second device belongs, performing, by the second device, channel measurement or feedback on the data frame.

According to a third aspect, a first device is provided, is applied to a Long Term Evolution unlicensed LTE-U system, and includes:

a determining unit, configured to determine a to-be-transmitted data frame, where the to-be-transmitted data frame carries an identifier of an operator to which the first device belongs; and a sending unit, configured to transmit the to-be-transmitted data frame to a second device.

With reference to the third aspect, in a first possible implementation manner, the to-be-transmitted data frame determined by the determining unit further carries an identifier of the to-be-transmitted data frame and/or a sequence number of the to-be-transmitted data frame in a transmission pattern, and the transmission pattern includes a quantity and sequence numbers of data frames in one transmission period.

With reference to the third aspect or the first possible implementation manner of the third aspect, in a second possible implementation manner, the to-be-transmitted data frame determined by the determining unit further carries an identifier of the first device.

With reference to the third aspect or the first to the second possible implementation manners of the third aspect, in a third possible implementation manner, the to-be-transmitted data frame determined by the determining unit further carries a synchronization signal.

With reference to the third possible implementation manner of the third aspect, in a fourth possible implementation manner, the synchronization signal includes a primary synchronization signal PSS and/or a secondary synchronization signal SSS.

With reference to the third aspect or the first to the fourth possible implementation manners of the third aspect, in a fifth possible implementation manner, the first device is a base station or user equipment; and the second device is a base station or user equipment.

According to a fourth aspect, a second device is provided, is applied to a Long Term Evolution unlicensed LTE-U system, and includes:

a receiving unit, configured to receive a data frame transmitted by a first device, where the data frame carries an identifier of an operator to which the first device belongs; and a processing unit, configured to process, according to the identifier of the operator to which the first device belongs, the data frame transmitted by the first device.

With reference to the fourth aspect, in a first possible implementation manner, the data frame received by the receiving unit further carries an identifier of the data frame and/or a sequence number of the data frame in a transmission pattern, and the transmission pattern includes a quantity and sequence numbers of data frames in one transmission period.

With reference to the fourth aspect or the first possible implementation manner of the fourth aspect, in a second possible implementation manner, the data frame received by the receiving unit further carries an identifier of the first device.

With reference to the fourth aspect or the first to the second possible implementation manners of the fourth aspect, in a third possible implementation manner, the data frame received by the receiving unit further carries a synchronization signal.

With reference to the third possible implementation manner of the fourth aspect, in a fourth possible implementation manner, the synchronization signal includes a primary synchronization signal PSS and/or a secondary synchronization signal SSS.

With reference to the fourth aspect or the first to the fourth possible implementation manners of the fourth aspect, in a fifth possible implementation manner, the first device is a base station or user equipment; and the second device is a base station or user equipment.

With reference to the fourth aspect or the first to the fifth possible implementation manners of the fourth aspect, in a sixth possible implementation manner, the processing unit is specifically configured to:

when the identifier of the operator to which the first device belongs is the same as an identifier of an operator to which the second device belongs, perform channel measurement or feedback on the data frame.

According to a fifth aspect, a first device is provided, is applied to a Long Term Evolution unlicensed LTE-U system, and includes:

a processor, configured to determine a to-be-transmitted data frame, where the to-be-transmitted data frame carries an identifier of an operator to which the first device belongs; and a transmitter, configured to transmit the to-be-transmitted data frame to a second device.

With reference to the fifth aspect, in a first possible implementation manner, the to-be-transmitted data frame determined by the processor further carries an identifier of the to-be-transmitted data frame and/or a sequence number of the to-be-transmitted data frame in a transmission pattern, and the transmission pattern includes a quantity and sequence numbers of data frames in one transmission period.

With reference to the fifth aspect or the first possible implementation manner of the fifth aspect, in a second possible implementation manner, the to-be-transmitted data frame determined by the processor further carries an identifier of the first device.

With reference to the fifth aspect or the first to the second possible implementation manners of the fifth aspect, in a third possible implementation manner, the to-be-transmitted data frame determined by the processor further carries a synchronization signal.

With reference to the third possible implementation manner of the fifth aspect, in a fourth possible implementation manner, the synchronization signal includes a primary synchronization signal PSS and/or a secondary synchronization signal SSS.

With reference to the fifth aspect or the first to the fourth possible implementation manners of the fifth aspect, in a fifth possible implementation manner, the first device is a base station or user equipment; the second device is a base station or user equipment.

According to a sixth aspect, a second device is provided, is applied to a Long Term Evolution unlicensed LTE-U system, and includes:

a receiver, configured to receive a data frame transmitted by a first device, where the data frame carries an identifier of an operator to which the first device belongs; and a processor, configured to process, according to the identifier of the operator to which the first device belongs, the data frame transmitted by the first device.

With reference to the sixth aspect, in a first possible implementation manner, the data frame received by the receiver further carries an identifier of the data frame and/or a sequence number of the data frame in a transmission pattern, and the transmission pattern includes a quantity and sequence numbers of data frames in one transmission period.

With reference to the sixth aspect or the first possible implementation manner of the sixth aspect, in a second possible implementation manner, the data frame received by the receiver further carries an identifier of the first device.

With reference to the sixth aspect or the first to the second possible implementation manners of the sixth aspect, in a third possible implementation manner, the data frame received by the receiver further carries a synchronization signal.

With reference to the third possible implementation manner of the sixth aspect, in a fourth possible implementation manner, the synchronization signal includes a primary synchronization signal PSS and/or a secondary synchronization signal SSS.

With reference to the sixth aspect or the first to the fourth possible implementation manners of the sixth aspect, in a fifth possible implementation manner, the first device is a base station or user equipment; and the second device is a base station or user equipment.

With reference to the sixth aspect or the first to the fifth possible implementation manners of the sixth aspect, in a sixth possible implementation manner, the processor is specifically configured to:

when the identifier of the operator to which the first device belongs is the same as an identifier of an operator to which the second device belongs, perform channel measurement or feedback on the data frame.

In the embodiments of the present invention, a method for transmitting a data frame is provided, and the method is applied to an LTE-U system. In this method, a first device determines a to-be-transmitted data frame, where the to-be-transmitted data frame carries an identifier of an operator to which the first device belongs; the first device transmits the to-be-transmitted data frame to a second device, and the second device processes, according to the identifier of the operator to which the first device belongs, the data frame transmitted by the first device. Because the to-be-transmitted data frame determined by the first device carries the identifier of the operator to which the first device belongs, the first device can accurately perform channel measurement and feedback.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, preferred implementation manners of the present invention are described in detail with reference to the accompanying drawings. It should be understood that the preferred embodiments described herein are merely used to illustrate and explain the present invention, but are not intended to limit the present invention. In addition, the embodiments of the present application and features in the embodiments may be mutually combined in a case in which they do not conflict with each other.

In the following, the preferred implementation manners of the present invention are described in detail with reference to the accompanying drawings.

Figure 1:
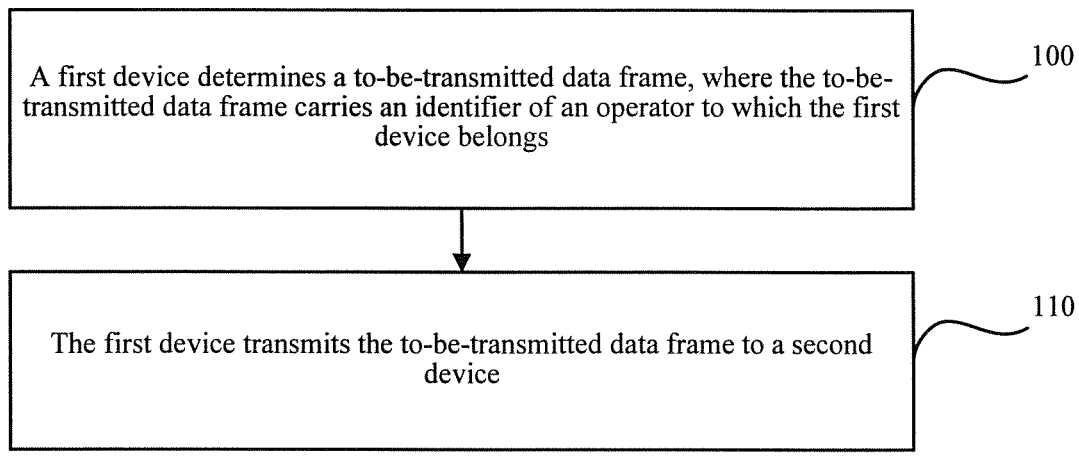
FIG. 1 is a flowchart of transmitting a data frame according to an embodiment of the present invention.

Referring to FIG. 1, in an embodiment of the present invention, a procedure of transmitting a data frame is as follows. The procedure is applied to an LTE-U system.

Step 100: A first device determines a to-be-transmitted data frame, where the to-be-transmitted data frame carries an identifier of an operator to which the first device belongs.

Step 110: The first device transmits the to-be-transmitted data frame to a second device.

In this embodiment of the present invention, manners for legitimately using an unlicensed frequency band by the LTE-U system may be classified into two types: one is an FBE (full spelling in English: frame based equipment) manner, and the other is an LBE (full spelling in English: load based equipment) manner.

When an LTE-U node and a node in a WiFi system (a WiFi node for short) simultaneously preempt a channel in the LBE manner and in the LBE manner respectively, a probability that the LTE-U node successfully preempts the channel is the same as a probability that the WiFi node successfully preempts the channel. However, in such a manner, a time during which the LTE-U node occupies the channel is completely random. Therefore, a time during which the LTE-U node interferes with another LTE-U node is also random.

When the LTE-U node and the WiFi node simultaneously preempt a channel in the FBE manner and in the LBE manner respectively, a time during which the LTE-U node occupies the channel is fixed (foreseen). However, in such a manner, a probability that the LTE-U node successfully preempts the channel is lower than a probability that the WiFi node successfully preempts the channel.

Currently, in an LTE authorization system, there is only one operator to which a spectrum belongs, and the operator is known. Therefore, the second device may accurately perform measurement and feedback in the LTE authorization system. However, in the LTE-U system, there may be multiple operators on a spectrum. Some first devices belong to a first operator, and some first devices belong to a second operator. If the second device belongs to the second operator, a data frame sent by a first device belonging to the first operator is detected. If the second device performs measurement according to the data frame sent by the first device belonging to the first operator, and performs feedback to a first device belonging to the second operator, feedback of the second device is incorrect and has relatively low accuracy. Therefore, in this embodiment of the present invention, to improve the accuracy of measurement and feedback, the to-be-transmitted data frame carries the identifier of the operator to which the first device belongs.

For example, the second device receives multiple data frames. Some data frames are sent by first devices belonging to the first operator, some data frames are sent by first devices belonging to the second operator, and the second device belongs to the first operator. Therefore, the second device measures a channel transmitting a data frame carrying an identifier of the first operator and performs feedback.

Currently, in the LTE authorization system, data frames sent by an LTE node are continuous, and the second device may also receive all continuous data subframes. However, in the LTE-U system, a data frame sent by the first device may be lost. In this case, the second device cannot receive continuous data frames. Therefore, the second device sends incorrect feedback, and the first device performs incorrect scheduling. Moreover, because an interference of a channel is not flat between data frames, and interferences to different data frames are different, the second device needs to separately calculate channel responses of the data frames and separately perform channel feedback. Before measuring a channel for transmitting a data frame, the second device needs to clearly learn which data frame is transmitted by the measured channel, and then may calculate a channel response of the data frame and feed back channel information of the channel corresponding to the data frame to the first device. If the second device cannot distinguish which channel transmits which data frame, the second device cannot correspondingly feed back a channel corresponding to an accurate data frame to the first device, and the first device then cannot implement accurate scheduling. To improve the accuracy of measurement and feedback of the second device, so as to improve scheduling accuracy of the first device, in this embodiment of the present invention, the to-be-transmitted data frame further carries an identifier of the to-be-transmitted data frame and/or a sequence number of the to-be-transmitted data frame in a transmission pattern. Optionally, the transmission pattern includes a quantity and sequence numbers of data frames in one transmission period.

In the prior art, a data frame transmitted in the LTE authorization system does not carry an identifier of the first device, and the identifier of the first device is carried in a synchronization signal. When detecting the identifier of the first device, the second device checks whether the synchronization signal exceeds a preset threshold, to obtain the identifier of the first device from a synchronization signal exceeding the preset threshold. However, in LTE-U, the method has problems of missing detection and false alarm detection. Therefore, to improve the accuracy of obtaining the identifier of the first device by the second device, so as to accurately perform feedback to the first device, in this embodiment of the present invention, the to-be-transmitted data frame further carries the identifier of the first device. In this way, the second device may obtain the identifier of the first device from the received data frame, avoiding the problems of missing detection and false alarm detection.

For example, after a base station 1 sends a data frame including an identifier of the base station 1 to user equipment, the user equipment determines, from the data frame, that the data frame is sent by the base station 1. Therefore, the user equipment feeds back, to the base station 1, a channel measurement result of a channel for transmitting the data frame.

In this embodiment of the present invention, further, to obtain time information of the transmitted data frame, the data frame may further carry synchronization information.

Optionally, the synchronization information may be a PSS (Primary Synchronized Signal, primary synchronization signal) and/or an SSS (Secondary Synchronization Signal, secondary synchronization signal).

With development of technologies, the to-be-transmitted data frame may further carry other information. For brevity, details are not described herein one by one again.

In this embodiment of the present invention, after the first device transmits the to-be-transmitted data frame to the second device, the method further includes:

receiving a channel measurement result fed back by the second device.

In this embodiment of the present invention, optionally, the first device is a base station or user equipment, and the second device is a base station or user equipment.

The first device and the second device that are mentioned in this embodiment of the present invention are used to distinguish two devices only, and are not specifically limited.

In this embodiment of the present invention, because the to-be-transmitted data frame determined by the first device carries the identifier of the operator to which the first device belongs, the first device may accurately perform channel measurement and feedback, overcoming a disadvantage in the prior art that in a data frame transmission manner of an LTE-U node in an LTE-U system, accuracy of channel measurement and feedback performed by the LTE-U node is relatively low.

Figure 2:
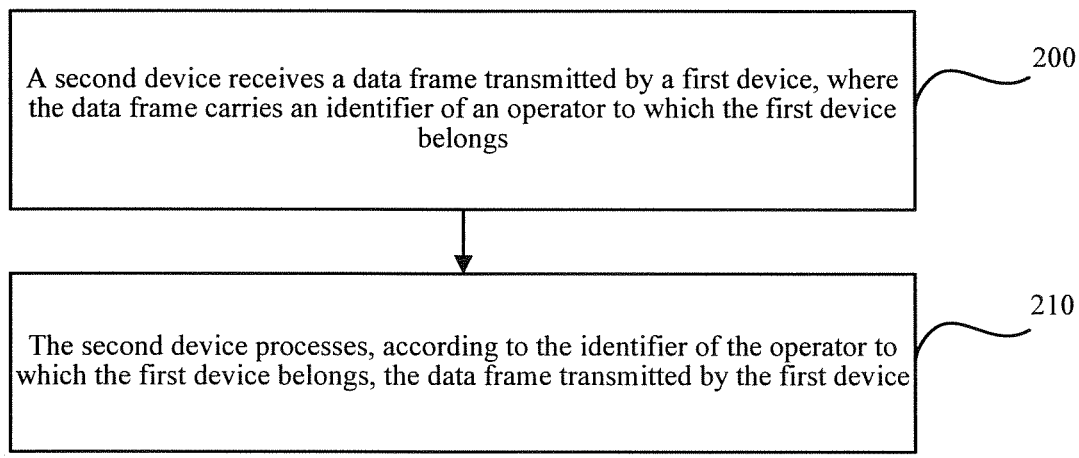
FIG. 2 is another flowchart of transmitting a data frame according to an embodiment of the present invention.

Referring to FIG. 2, in an embodiment of the present invention, another procedure of transmitting a data frame is as follows. The procedure is applied to an LTE-U system.

Step 200: A second device receives a data frame transmitted by a first device, where the data frame carries an identifier of an operator to which the first device belongs.

Step 210: The second device processes, according to the identifier of the operator to which the first device belongs, the data frame transmitted by the first device.

To improve the accuracy of feedback, in this embodiment of the present invention, further, the data frame further carries an identifier of the data frame and/or a sequence number of the data frame in a transmission pattern, and the transmission pattern includes a quantity and sequence numbers of data frames in one transmission period.

To improve the accuracy of feedback, in this embodiment of the present invention, further, the data frame further carries the identifier of the first device.

In this embodiment of the present invention, further, the data frame further carries a synchronization signal.

In this embodiment of the present invention, optionally, the synchronization signal includes a PSS and/or an SSS.

In this embodiment of the present invention, optionally, the first device is a base station or user equipment, and the second device is a base station or user equipment.

In this embodiment of the present invention, there are multiple manners for processing, by the second device according to the identifier of the operator to which the first device belongs, the data frame transmitted by the first device, and optionally, the following manner may be used:

when the identifier of the operator to which the first device belongs is the same as an identifier of an operator to which the second device belongs, performing, by the second device, channel measurement or feedback on the data frame.

The first device and the second device that are mentioned in this embodiment of the present invention are used to distinguish two devices only, and are not specifically limited.

In this embodiment of the present invention, because the to-be-transmitted data frame determined by the first device carries the identifier of the operator to which the first device belongs, the first device may accurately perform channel measurement and feedback, overcoming a disadvantage in the prior art that in a data frame transmission manner of an LTE-U node in an LTE-U system, accuracy of channel measurement and feedback performed by the LTE-U node is relatively low.

Figure 3:
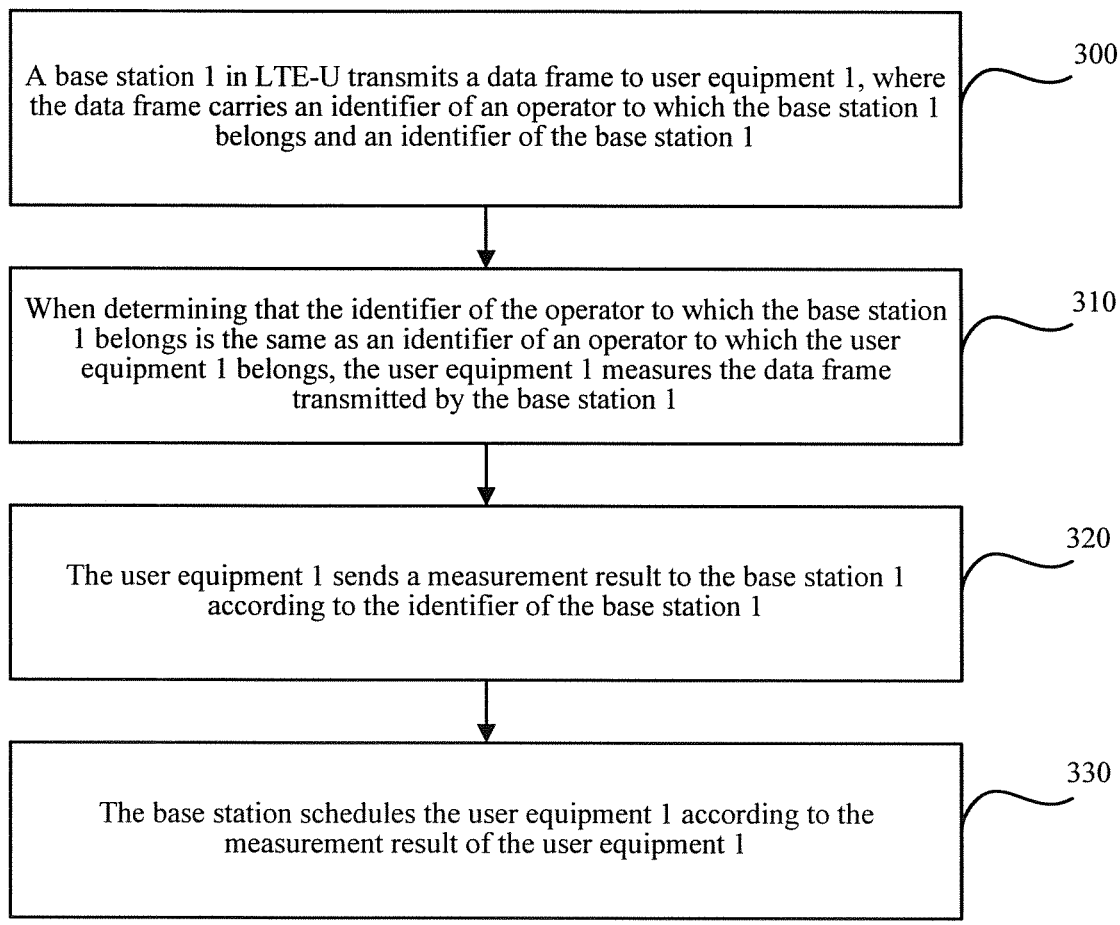
FIG. 3 shows an embodiment of transmitting a data frame according to an embodiment of the present invention.

To better understand this embodiment of the present invention, a specific application scenario is provided below, so as to further describe in detail the procedure of transmitting a data frame, as shown in FIG. 3:

Step 300: A base station 1 in LTE-U transmits a data frame to user equipment 1, where the data frame carries an identifier of an operator to which the base station 1 belongs and an identifier of the base station 1.

Step 310: When determining that the identifier of the operator to which the base station 1 belongs is the same as an identifier of an operator to which the user equipment 1 belongs, the user equipment 1 measures the data frame transmitted by the base station 1.

Step 320: The user equipment 1 sends a measurement result to the base station 1 according to the identifier of the base station 1.

Step 330: The base station schedules the user equipment 1 according to the measurement result of the user equipment 1.

Figure 4A:
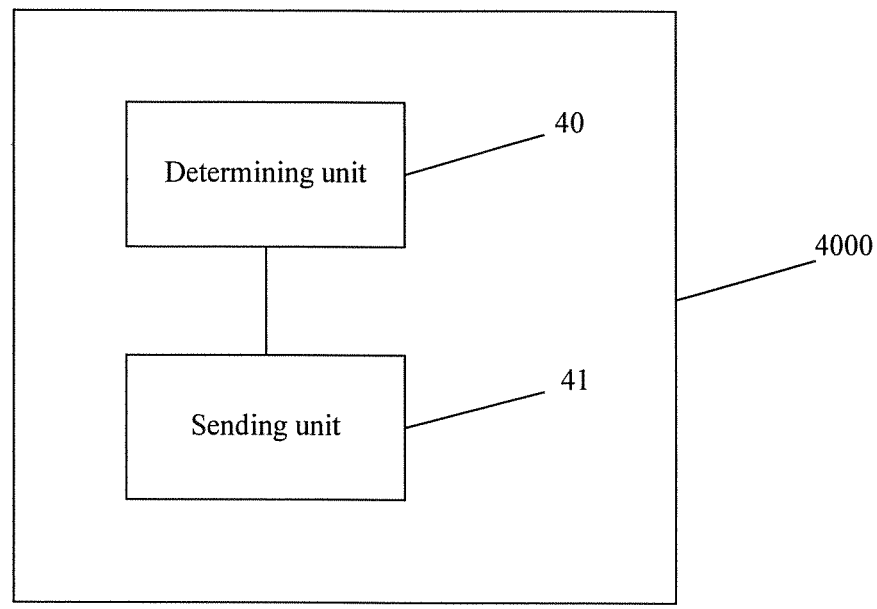
FIG. 4A is a schematic structural diagram of a first device according to an embodiment of the present invention.

Based on the technical solution of the foregoing corresponding method, referring to FIG. 4A, an embodiment of the present invention provides a first device 4000. The first device 4000 includes a determining unit 40 and a sending unit 41, where the determining unit 40 is configured to determine a to-be-transmitted data frame, where the to-be-transmitted data frame carries an identifier of an operator to which the first device belongs; and the sending unit 41 is configured to transmit the to-be-transmitted data frame to a second device 5000.

In this embodiment of the present invention, further, the to-be-transmitted data frame determined by the determining unit 40 further carries an identifier of the to-be-transmitted data frame and/or a sequence number of the to-be-transmitted data frame in a transmission pattern, and the transmission pattern includes a quantity and sequence numbers of data frames in one transmission period.

In this embodiment of the present invention, further, the to-be-transmitted data frame determined by the determining unit 40 further carries an identifier of the first device.

In this embodiment of the present invention, further, the to-be-transmitted data frame determined by the determining unit 40 further carries a synchronization signal.

In this embodiment of the present invention, optionally, the synchronization signal includes a PSS and/or an SSS.

In this embodiment of the present invention, optionally, the first device 4000 is a base station or user equipment, and the second device 5000 is a base station or user equipment.

Figure 4B:
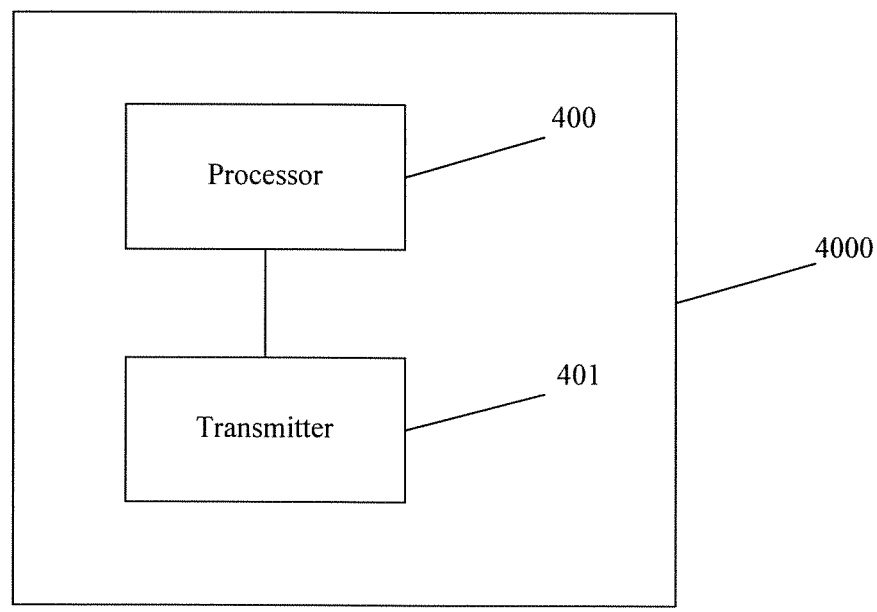
FIG. 4B is another schematic structural diagram of a first device according to an embodiment of the present invention.

As shown in FIG. 4B, FIG. 4B is another schematic structural diagram of a first device 4000 according to an embodiment of the present invention. The device includes a processor 400 and a transmitter 401, where the processor 400 is configured to determine a to-be-transmitted data frame, where the to-be-transmitted data frame carries an identifier of an operator to which the first device belongs; and the transmitter 401 is configured to transmit the to-be-transmitted data frame to a second device 5000.

In this embodiment of the present invention, further, the to-be-transmitted data frame determined by the processor 400 further carries an identifier of the to-be-transmitted data frame and/or a sequence number of the to-be-transmitted data frame in a transmission pattern, and the transmission pattern includes a quantity and sequence numbers of data frames in one transmission period.

In this embodiment of the present invention, further, the to-be-transmitted data frame determined by the processor 400 further carries an identifier of the first device.

In this embodiment of the present invention, further, the to-be-transmitted data frame determined by the processor 400 further carries a synchronization signal.

In this embodiment of the present invention, further, the synchronization signal includes a PSS and/or an SSS.

In this embodiment of the present invention, optionally, the first device 4000 is a base station or user equipment, and the second device 5000 is a base station or user equipment.

Figure 5A:
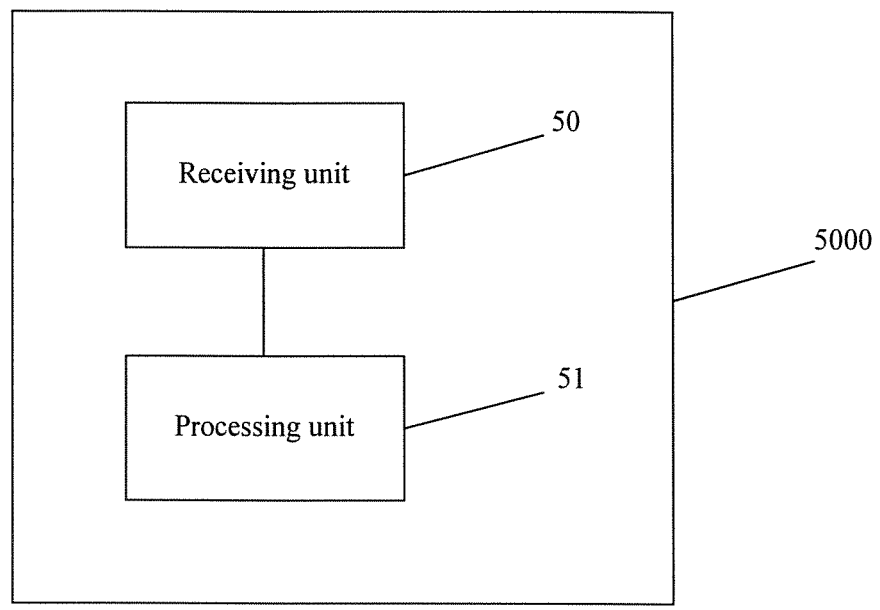
FIG. 5A is a schematic structural diagram of a second device according to an embodiment of the present invention.

Based on the technical solution of the foregoing corresponding method, referring to FIG. 5A, an embodiment of the present invention provides a second device 5000. The second device 5000 includes a receiving unit 50 and a processing unit 51, where the receiving unit 50 is configured to receive a data frame transmitted by a first device 4000, where the data frame carries an identifier of an operator to which the first device belongs; and the processing unit 51 is configured to process, according to the identifier of the operator to which the first device belongs, the data frame transmitted by the first device 4000.

In this embodiment of the present invention, further, the data frame received by the receiving unit 50 further carries an identifier of the data frame and/or a sequence number of the data frame in a transmission pattern, and the transmission pattern includes a quantity and sequence numbers of data frames in one transmission period.

In this embodiment of the present invention, further, the data frame received by the receiving unit 50 further carries an identifier of the first device.

In this embodiment of the present invention, further, the data frame received by the receiving unit 50 further carries a synchronization signal.

In this embodiment of the present invention, further, the synchronization signal includes a PSS and/or an SSS.

In this embodiment of the present invention, optionally, the first device 4000 is a base station or user equipment, and the second device 5000 is a base station or user equipment.

In this embodiment of the present invention, optionally, the processing unit 51 is specifically configured to:

when the identifier of the operator to which the first device belongs is the same as an identifier of an operator to which the second device belongs, perform channel measurement or feedback on the data frame.

Figure 5B:
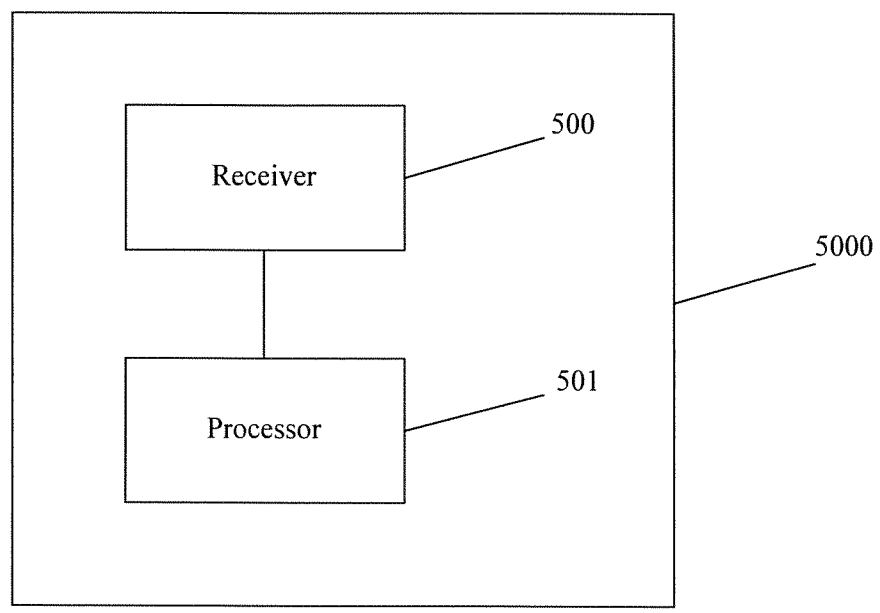
FIG. 5B is another schematic structural diagram of a second device according to an embodiment of the present invention.

As shown in FIG. 5B, FIG. 5B is another schematic structural diagram of a second device 5000 according to an embodiment of the present invention. The device includes a receiver 500 and a processor 501, where the receiver 500 is configured to receive a data frame transmitted by a first device 4000, where the data frame carries an identifier of an operator to which the first device belongs; and the processor 501 is configured to process, according to the identifier of the operator to which the first device belongs, the data frame transmitted by the first device 4000.

In this embodiment of the present invention, further, the data frame received by the receiver 500 further carries an identifier of the data frame and/or a sequence number of the data frame in a transmission pattern, and the transmission pattern includes a quantity and sequence numbers of data frames in one transmission period.

In this embodiment of the present invention, further, the data frame received by the receiver 500 further carries an identifier of the first device.

In this embodiment of the present invention, further, the data frame received by the receiver 500 further carries a synchronization signal.

In this embodiment of the present invention, optionally, the synchronization signal includes a primary synchronization signal PSS and/or a secondary synchronization signal SSS.

In this embodiment of the present invention, optionally, the first device 4000 is a base station or user equipment, and the second device 5000 is a base station or user equipment.

In this embodiment of the present invention, optionally, the processor 501 is specifically configured to:

when the identifier of the operator to which the first device belongs is the same as an identifier of an operator to which the second device belongs, perform channel measurement or feedback on the data frame.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams.

These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method for transmitting a data frame in a Long Term Evolution unlicensed (LTE-U) system, the method comprising:
determining, by a first LTE-U device, a to-be-transmitted data frame, wherein the to-be-transmitted data frame carries an identifier of an operator to which the first LTE-U device belongs, and wherein the to-be-transmitted data frame further carries a synchronization signal and a sequence number of the-to-be transmitted data frame in a transmission pattern that comprises a quantity of data frames in one transmission period;
transmitting, by the first LTE-U device, the to-be-transmitted data frame to a second LTE-U device in an unlicensed band, wherein the identifier of the operator is transmitted outside of the synchronization signal comprised in the to-be-transmitted data frame; and
receiving, by the first LTE-U device, a measurement result from the second LTE-U device, wherein the measurement result is obtained based on data frames that carry the identifier of the operator to which the first LTE-U device belongs.

2. The method according to claim 1, wherein the to-be-transmitted data frame further carries an identifier of the to-be-transmitted data frame in the transmission pattern, and the transmission pattern further comprises sequence numbers of the data frames in the transmission period.

3. The method according to claim 1, wherein the to-be-transmitted data frame further carries an identifier of the first LTE-U device.

4. The method according to claim 1, wherein the synchronization signal comprises at least one of a primary synchronization signal (PSS) or a secondary synchronization signal (SSS).

5. The method according to claim 1, wherein:
the first LTE-U device is a base station or user equipment; and
the second LTE-U device is a base station or user equipment.

6. A method for receiving a data frame in a Long Term Evolution unlicensed (LTE-U) system, the method comprising:
receiving, by a second LTE-U device, a data frame transmitted by a first LTE-U device in an unlicensed band, wherein the data frame carries an identifier of an operator to which the first LTE-U device belongs, wherein the data frame further carries a synchronization signal and a sequence number of the to-be-transmitted data frame in a transmission pattern that comprises a quantity of data frames in one transmission period, and wherein the identifier of the operator is transmitted outside of the synchronization signal;

processing, by the second LTE-U device according to the identifier of the operator to which the first LTE-U device belongs, the data frame transmitted by the first LTE-U device;
when the identifier of the operator in the received data frame is the same as an identifier of an operator to which the second LTE-U device belongs, performing, by the second LTE-U device, channel measurement on a channel on which the data frame is transmitted; and
sending, by the second LTE-U device, a measurement result to the first LTE-U device.

7. The method according to claim 6, wherein the data frame further carries an identifier of the data frame in the transmission pattern, and the transmission pattern further comprises sequence numbers of the data frames in the transmission period.

8. The method according to claim 6, wherein the data frame further carries an identifier of the first LTE-U device.

9. The method according to claim 6, wherein the synchronization signal comprises at least one of a primary synchronization signal (PSS) or a secondary synchronization signal (SSS).

10. The method according to claim 6, wherein:
the first LTE-U device is a base station or user equipment; and
the second LTE-U device is a base station or user equipment.

11. A first device for use in a Long Term Evolution unlicensed (LTE-U) system, the first device comprising:
a processor, configured to determine a to-be-transmitted data frame, wherein the to-be-transmitted data frame carries an identifier of an operator to which the first device belongs, and wherein the to-be-transmitted data frame further carries a synchronization signal and carries a sequence number of the to-be-transmitted data frame in a transmission pattern that comprises a quantity of data frames in one transmission period;
a transmitter, configured to transmit the to-be-transmitted data frame to a second LTE-U device in an unlicensed band, wherein the identifier of the operator is transmitted outside of the synchronization signal comprised in the to-be-transmitted data frame; and
a receiver, configured to receive a measurement result from the second LTE-U device, wherein the measurement result is obtained based on data frames that carry the identifier of the operator to which the first LTE-U device belongs.

12. The first device according to claim 11, wherein the to-be-transmitted data frame determined by the processor further carries an identifier of the to-be-transmitted data frame in the transmission pattern, and the transmission pattern further comprises sequence numbers of the data frames in the transmission period.

13. The first device according to claim 11, wherein the to-be-transmitted data frame determined by the processor further carries an identifier of the first device.

14. The first device according to claim 11, wherein the synchronization signal comprises at least one of a primary synchronization signal (PSS) or a secondary synchronization signal (SSS).

15. The first device according to claim 11, wherein:
the first device is a base station or user equipment; and
the second LTE-U device is a base station or user equipment.

* * * * *

UNITED STATES PATENT AND TRADEMARK OFFICE
CERTIFICATE OF CORRECTION

PATENT NO. : 10,925,015 B2  
APPLICATION NO. : 15/523053  
DATED : February 16, 2021  
INVENTOR(S) : Jian Wang Page 1 of 1

It is certified that error appears in the above-identified patent and that said Letters Patent is hereby corrected as shown below:

On the Title Page

Column 1, item (54), Lines 1-4, delete "METHOD AND APPARATUS FOR TRANSMITTING DATA FRAME IN A LONG TERM EVOLUTION UNLICENSED (LTE-U)SYSTEM" and insert --METHOD AND APPARATUS FOR TRANSMITTING A DATA FRAME IN A LONG TERM EVOLUTION UNLICENSED (LTE-U) SYSTEM-- therefore In the Specification Column 1, Lines 1-4, delete "METHOD AND APPARATUS FOR TRANSMITTING DATA FRAME IN A LONG TERM EVOLUTION UNLICENSED (LTE-U)SYSTEM" and insert --METHOD AND APPARATUS FOR TRANSMITTING A DATA FRAME IN A LONG TERM EVOLUTION UNLICENSED (LTE-U) SYSTEM-- therefore In the Claims Column 12, Line 25, delete "the-to-be transmitted" and insert --the to-be-transmitted-- therefore Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*